Patented Feb. 26, 1929.

1,703,125

UNITED STATES PATENT OFFICE.

JULIUS E. UNDERWOOD AND CHARLES A. CABELL, OF WASHINGTON, DISTRICT OF COLUMBIA, ASSIGNORS TO NATIONAL LIME ASSOCIATION, A CORPORATION OF THE DISTRICT OF COLUMBIA.

PLASTER.

No Drawing. Application filed April 21, 1926. Serial No. 103,637.

This invention relates to plaster compositions, and is particularly directed to the production of a lime base plastic having a quick initial set and a relatively high final tensile strength.

It is an object of this invention to provide a cementitious composition which will take on a set sufficient to permit second coating of material when used as a plaster in much shorter time than ordinary lime plasters, and which has in addition a higher tensile strength.

It is to be understood the definition of a set given herein does not intend to imply that the material is to be used only as a plaster. The composition is intended primarily for a plaster but may well be used for mortars and the manufacture of shaped articles, such as building blocks and the like.

It has been proposed to shorten the setting time of lime plasters by adding gypsum thereto. While such addition did accomplish a material reduction in the setting time of such plastics, it was found in many ways unsatisfactory.

We propose to treat lime hydrate or lime putty and similar material in such a manner as to overcome its natural slow setting properties and to increase the strength of the final product.

We have found that the cementitious properties of such plastics can be enhanced and the setting time and tensile strength adjusted by the addition to the lime hydrate or lime putty of known quantities of certain substances calculated to impart to the product these desired properties.

To produce our improved cementitious compositions, we treat lime hydrate or its equivalent with a substance which increases the tensile strength of the product and add to this mixture of the lime and strength imparted certain substances which function not only to regulate the setting time but also to give the resulting plaster additional strength.

We have found, as previously suggested, that the setting time of such plastics can be greatly reduced by the addition of a small amount of a substance containing an available sulphate radical. An improved product may be obtained and a greater degree of control may result if in addition to the sulphate there is added to the mixture a substance capable of supplying the carbonate radical and a small amount of sugar.

We find in addition that this product can be greatly improved by incorporating therein a substance which acts to strengthen the plaster. After numerous experiments we have found that a material increase of the final strength may be had by adding relatively small amounts of an aluminous material. As a substance capable of increasing the strength, we have found that prepared calcium aluminate serves very well. This choice is dictated in part by the fact that calcium aluminate is now obtainable on the market known as lumnite cement.

A product has in the past been placed on the market which consisted essentially of hydrated lime and calcium aluminate. Such a mixture, even with the aluminate component as high as twenty-five per cent, is not entirely suitable for plaster purposes in that the material tends to set very rapidly and application of it, when used for plastering is thereby rendered difficult. Such substances may be rendered suitable for plaster by adding a retarder, but because of the excessive quantity of the expensive aluminate component used its cost is prohibitive.

There has also been proposed as a quick setting plaster a substance comprising hydrated lime, calcium aluminate, and a soluble sulphate. In practical operations, such products have proved unsatisfactory; in some no appreciable reduction in the setting time was obtained and in others the finished product was deficient in strength.

We have found that by adding to the lime hydrate small proportions of sulphate, carbonate, aluminate and sugar a product results which sets quickly and possesses a high tensile strength. Thus adding a carbonate to the lime and sulphate mixture we are able to obtain a very high final strength with the addition of but small amounts of the expensive aluminate and sugar components. We may use the lumnite cement in the hydrated or unhydrated form; as will appear from the subsequent tables, very satisfactory results are obtained with each.

The effect of the addition of relatively small amounts of the calcium aluminate strength imparter on cooperating cementitious materials comprising hydrated lime having incorporated therein small amounts of sulphate, carbonate and sugar is clearly depicted in the following tables. To clearly illustrate the effect attending on the addition of the aluminate the other components have been maintained constant in each test. The time of set, as determined by the standard Gillmore needle, is given in hours and minutes and the tensile strength in pounds per square inch after twenty-four hours.

| Lumnite | Aluminum sulphate | Calcium carbonate (W. S.) | Ground limestone | Sugar | Time of set | 24-hour tensile strength |
|---|---|---|---|---|---|---|
| 0 | .5 | 3 | 30 | .3 | 6:50 | 6 |
| 1 | .5 | 3 | 30 | .3 | 5:50 | 7 |
| 2 | .5 | 3 | 30 | .3 | 4:30 | 11 |
| 3 | .5 | 3 | 30 | .3 | 3:30 | 21 |
| 4 | .5 | 3 | 30 | .3 | 3:00 | 23 |
| 5 | .5 | 3 | 30 | .3 | 2:25 | 43 |
| 6 | .5 | 3 | 30 | .3 | 3:10 | 44 |
| 7 | .5 | 3 | 30 | .3 | 3:40 | 38 |
| 8 | .5 | 3 | 30 | .3 | 3:30 | 35 |
| 9 | .5 | 3 | 30 | .3 | 3:25 | 28 |
| 10 | .5 | 3 | 30 | .3 | 3:20 | 24 |

Sufficient hydrated lime to make 100%.

| Hydrated lumnite | Aluminum sulphate | Calcium carbonate (W. S.) | Ground limestone | Sugar | Time of set | 24-hour tensile strength |
|---|---|---|---|---|---|---|
| 0 | .5 | 3 | 30 | .3 | 6:45 | 6 |
| 1 | .5 | 3 | 30 | .3 | 5:45 | 6 |
| 3 | .5 | 3 | 30 | .3 | 5:35 | 8 |
| 5° | .5 | 3 | 30 | .3 | 2:35 | 40 |
| 5 | .5 | 3 | 30 | .3 | 3:25 | 12 |
| 7 | .5 | 3 | 30 | .3 | 3:25 | 24 |
| 9 | .5 | 3 | 30 | .3 | 3:15 | 36 |
| 11 | .5 | 3 | 30 | .3 | 2:55 | 45 |
| 13 | .5 | 3 | 30 | .3 | 2:25 | 59 |
| 15 | .5 | 3 | 30 | .3 | 2:20 | 56 |

Sufficient hydrated lime to make 100%.
° Ordinary lumnite.

It will be seen from the above tables that when ordinary, that is to say unhydrated lumnite is used, a rapid increase in strength is obtained up to about six per cent of this ingredient. Additions above this do not serve to decrease the time of set nor to increase the tensile strength, however, even with ten per cent of this ingredient the setting time is less than that of ordinary lime and the tensile strength is much higher. When hydrated lumnite is used, additions as high as thirteen per cent are accompanied by increase in the strength of the plaster and a decrease in setting time.

It will be appreciated that the time of set and strength of given samples of this composition will vary somewhat, depending upon the percentages of the different components. The tables above indicate the characteristics of the composition and particularly show the effect of the additions of definite percentages of calcium aluminate on the setting time and tensile strength of the plaster.

It may be found desirable in preparing a commercial plaster or blocks to use fillers such as sand, hair, ashes, etc. It will be appreciated that these do not affect the fundamental properties of the composition.

It is to be understood that we do not intend to be limited to the particular addition agents listed in the tables. As our carbonate addition agent, we prefer to use a slightly soluble carbonate such as precipitated calcium carbonate, magnesium carbonate, ground limestone, iron carbonate and zinc carbonate. Such carbonates are chosen to eliminate efflorescence in the finished plaster which would obtain if a more soluble carbonate, such as potassium or sodium carbonate were used. We may, however, use any substance that will render the carbonate radical available to the mix, such as lead carbonate, strontium carbonate, barium carbonate, ammonium carbonate, magnesite, etc.

As the sulphate ingredient, as designated in the table, we prefer to use aluminum sulphate. We have found, however, that the following may be used with satisfactory results: ferrous sulphate, ferric sulphate, sodium sulphate, manganese sulphate, magnesium sulphate and potassium sulphate. Any substance which will supply the sulphate radical or its equivalent may be utilized.

Similarly, the use of calcium aluminate represents a choice from a relatively large group of aluminous compounds. In place of this we may use clay, kaolin or sodium aluminate. As mentioned hereinbefore, we prefer to use calcium aluminate because of its relative purity and availability.

We have thus provided a plastic composition which has the desirable properties of quick available initial set and high final strength by the addition of but very small amounts of cooperating accelerating and strength imparting materials.

We claim:

1. A mix comprising hydrated lime having incorporated therein from 2% to 10% of hydrated calcium aluminate, a carbonate, a sulphate and sugar.

2. A cementitious composition comprising a hydrated alkaline earth, hydrated calcium aluminate, a carbonate and a sulphate.

3. A cementitious composition comprising a hydrated alkaline earth, hydrated calcium aluminate, a soluble carbonate and a sulphate.

4. A cementitious composition comprising hydrated lime, hydrated calcium aluminate, a carbonate, a sulphate and a retarder.

5. A cementitious composition comprising hydrated lime, hydrated calcium aluminate, a carbonate, a sulphate and sugar.

6. A cementitious composition comprising hydrated lime, hydrated calcium aluminate, a slightly soluble carbonate, a sulphate and a small amount of sugar.

7. A cementitious composition comprising hydrated lime, hydrated calcium aluminate, a slightly soluble carbonate, aluminum sulphate and sugar.

In testimony whereof we affix our signatures.

CHARLES A. CABELL.
JULIUS E. UNDERWOOD.